Aug. 5, 1952  P. E. SHERRILL, JR  2,606,265
POWER DRIVE MECHANISM AND CONTROL MEANS THEREFOR
Filed Dec. 5, 1950  6 Sheets-Sheet 1

INVENTOR:
Price E. Sherrill, Jr.
BY Paul & Paul
ATTORNEYS.

Aug. 5, 1952     P. E. SHERRILL, JR     2,606,265
POWER DRIVE MECHANISM AND CONTROL MEANS THEREFOR
Filed Dec. 5, 1950     6 Sheets-Sheet 2

INVENTOR:
Price E. Sherrill, Jr.
BY Paul & Paul
ATTORNEYS.

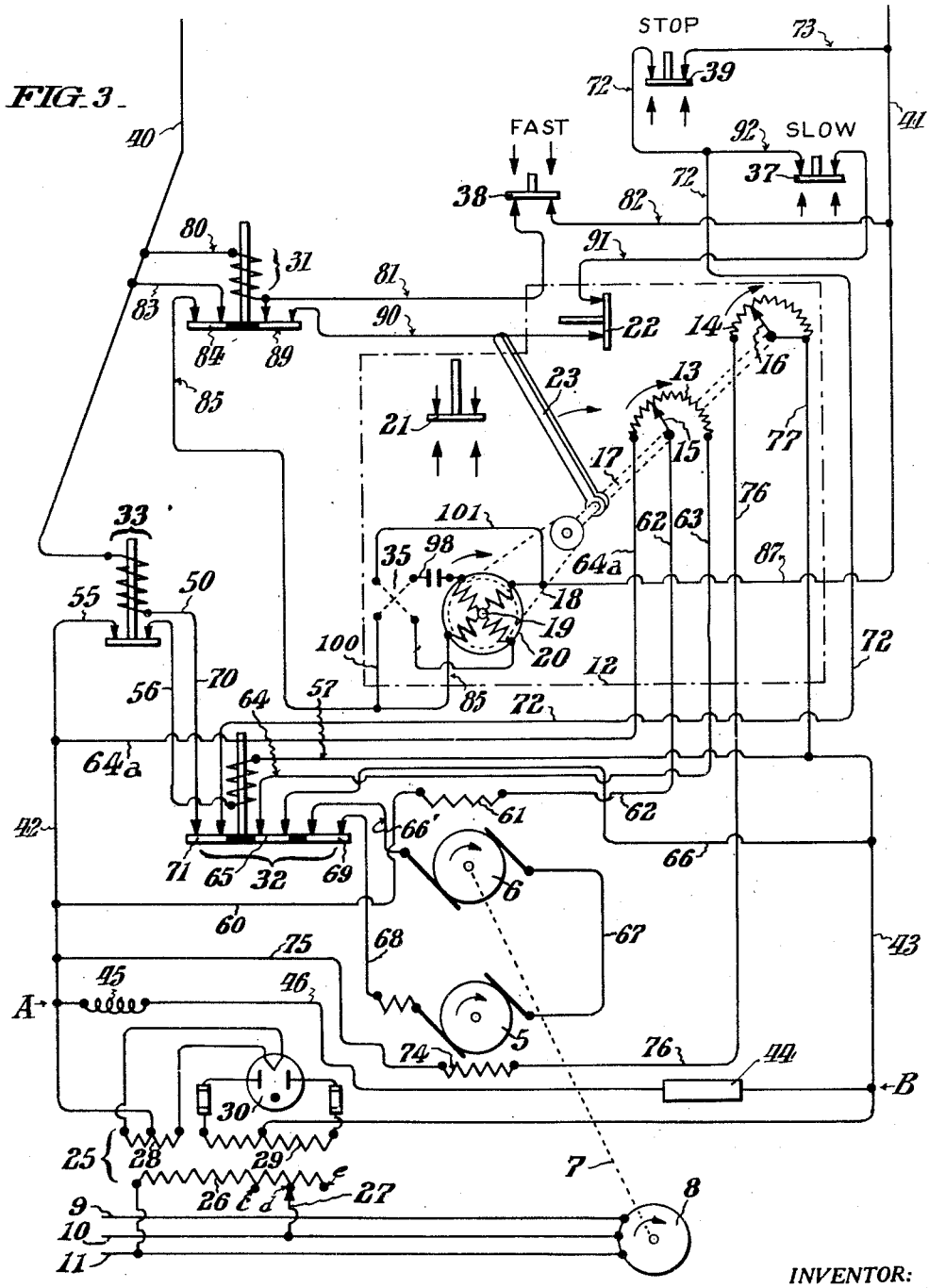

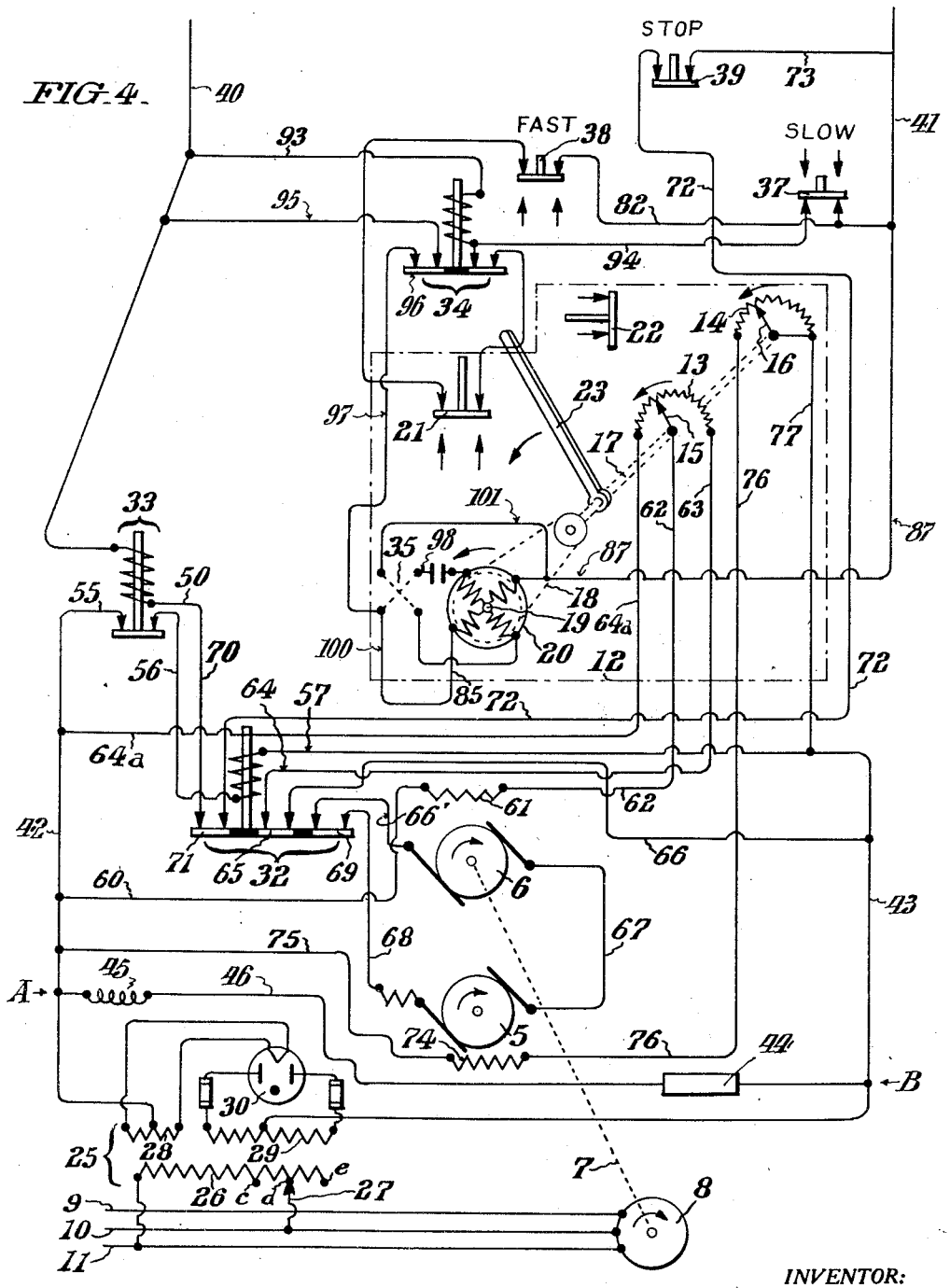

Aug. 5, 1952  P. E. SHERRILL, JR  2,606,265
POWER DRIVE MECHANISM AND CONTROL MEANS THEREFOR
Filed Dec. 5, 1950  6 Sheets-Sheet 5
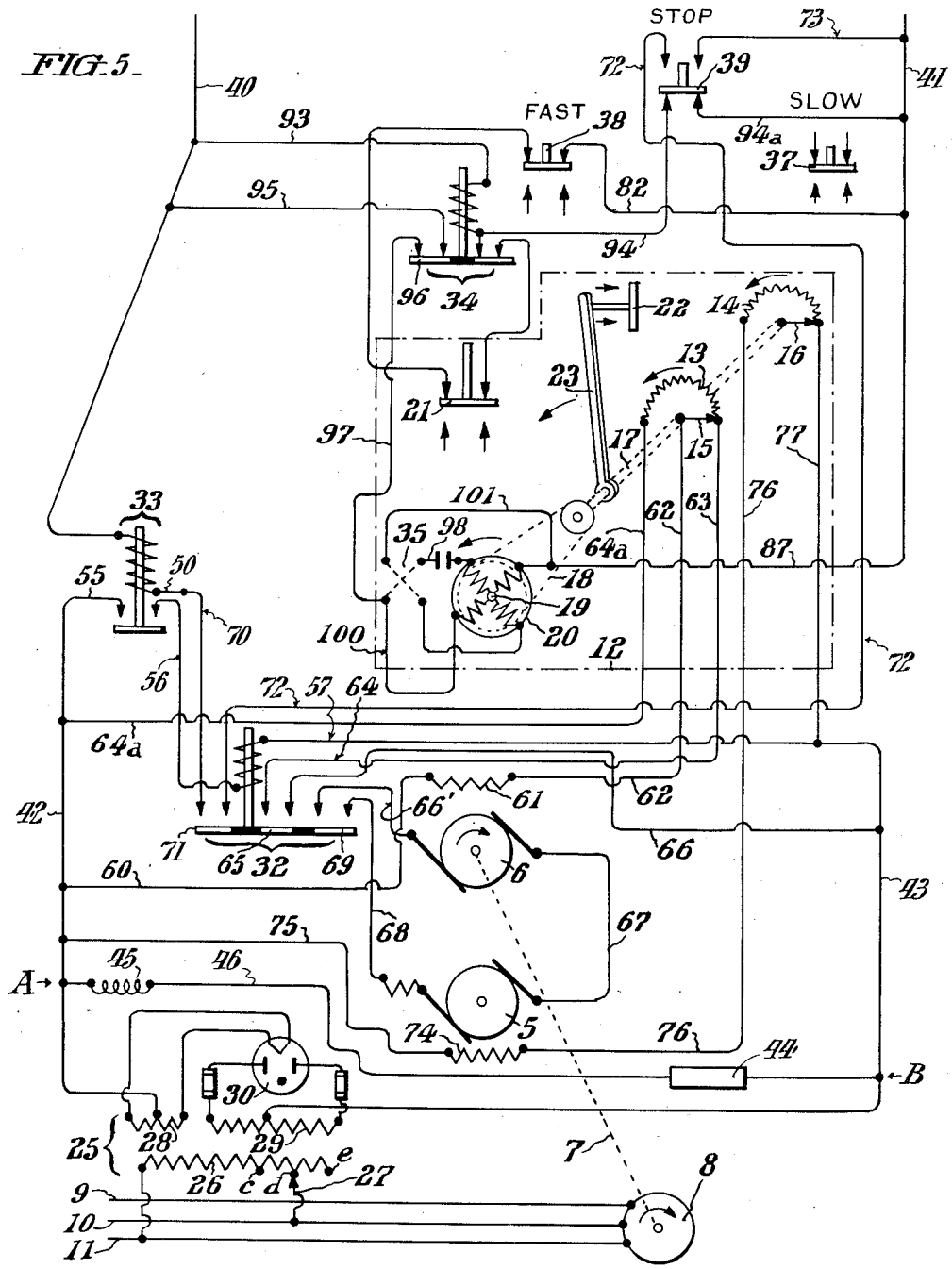
INVENTOR:
Price E. Sherrill, Jr.
BY Paul & Paul
ATTORNEYS.

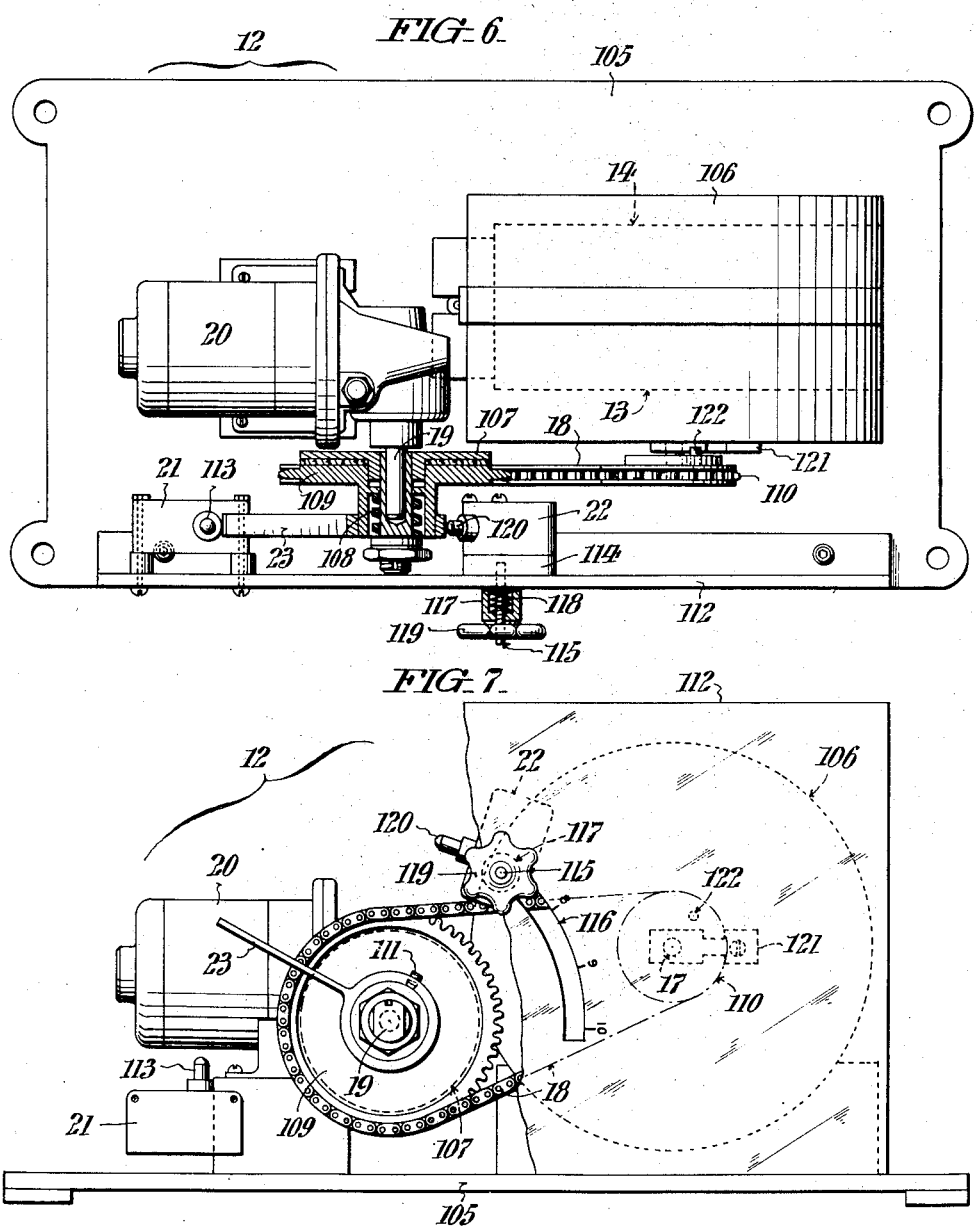

Patented Aug. 5, 1952

2,606,265

UNITED STATES PATENT OFFICE 2,606,265

POWER DRIVE MECHANISM AND CONTROL MEANS THEREFOR

Price E. Sherrill, Jr., Gastonia, N. C., assignor to Cocker Machine & Foundry Company, Gastonia, N. C., a corporation of North Carolina Application December 5, 1950, Serial No. 199,342

5 Claims. (Cl. 201—48)

1

This invention relates to power drive mechanisms and control means therefor.

In the operation of various kinds of textile machinery such as slashers and beamers, accurate speed control is essential for the maintenance of even tension on the yarns to insure uniform winding upon the beams. At the present time, alternating current is the only form of electric power available in most localities, and, by reason of the difficulty of controlling them, motors powered from this source are not suitable as a means for driving such machinery with smooth gradation between very slow and high speed limits.

The principal objective of my invention is to provide means for overcoming the above mentioned difficulties. This objective is attained, as more fully disclosed hereinafter, through the use of a shunt field D. C. motor as the prime mover in conjunction with a D. C. shunt field generator driven by an A. C. motor which may be of the induction type. The D. C. generator supplies the current for operating the D. C. motor, and variable resistance control means for regulating the speed of the D. C. motor are connected in circuit with the fields of the D. C. generator and the D. C. motor. A reversible A. C. servomotor for actuating the variable control means is utilized; and also a control system for electrically connecting the D. C. motor to the generator for starting at a definite slow or creeping speed. Means are included for starting the servomotor to actuate the variable control means and to thereby gradually reduce the resistance in the field circuit of the D. C. generator and add resistance in the field circuit of the D. C. motor in order to accelerate the latter to a definite high speed. In addition, automatic stop means are incorporated to stop the servomotor when the D. C. motor has attained a predetermined maximum speed. By manually controlled automatic means the servomotor is reversed to actuate the variable control means in the opposite direction thereby lowering the voltage of the field of the D. C. generator and decreasing the resistance in the field of the D. C. motor for return of the latter gradually to the slow or creeping speed; by other automatic means the servomotor is stopped when the last mentioned condition is reestablished. Automatic means is also operated to restore the system to its normal dormant condition.

In drive mechanism, characterized as above, it is a further aim of my invention to provide means whereby the stop means for the servomotor can be adjusted to predetermine the speed ranges of the D. C. motor.

Another object of my invention is to provide a preassembled control unit in which the variable control means is mechanically connected to the servomotor, and in which the stop means for said servomotor is arranged so as to be adjustable for the purpose above stated.

Other objects and attendant advantages will appear from the following detailed description of the attached drawings: wherein Fig. 1 is a diagrammatic view of my improved power drive mechanism.

Figs. 2–5 are similar views showing the control system under different conditions of operation.

Fig. 6 is a view, partly in top plan and partly in horizontal section, of a pre-assembled unit or device incorporating certain of the control instrumentalities employed in the system; and Fig. 7 is a front elevation of the pre-assembled device with a portion thereof broken away to expose parts which would otherwise be hidden.

Figure 1:
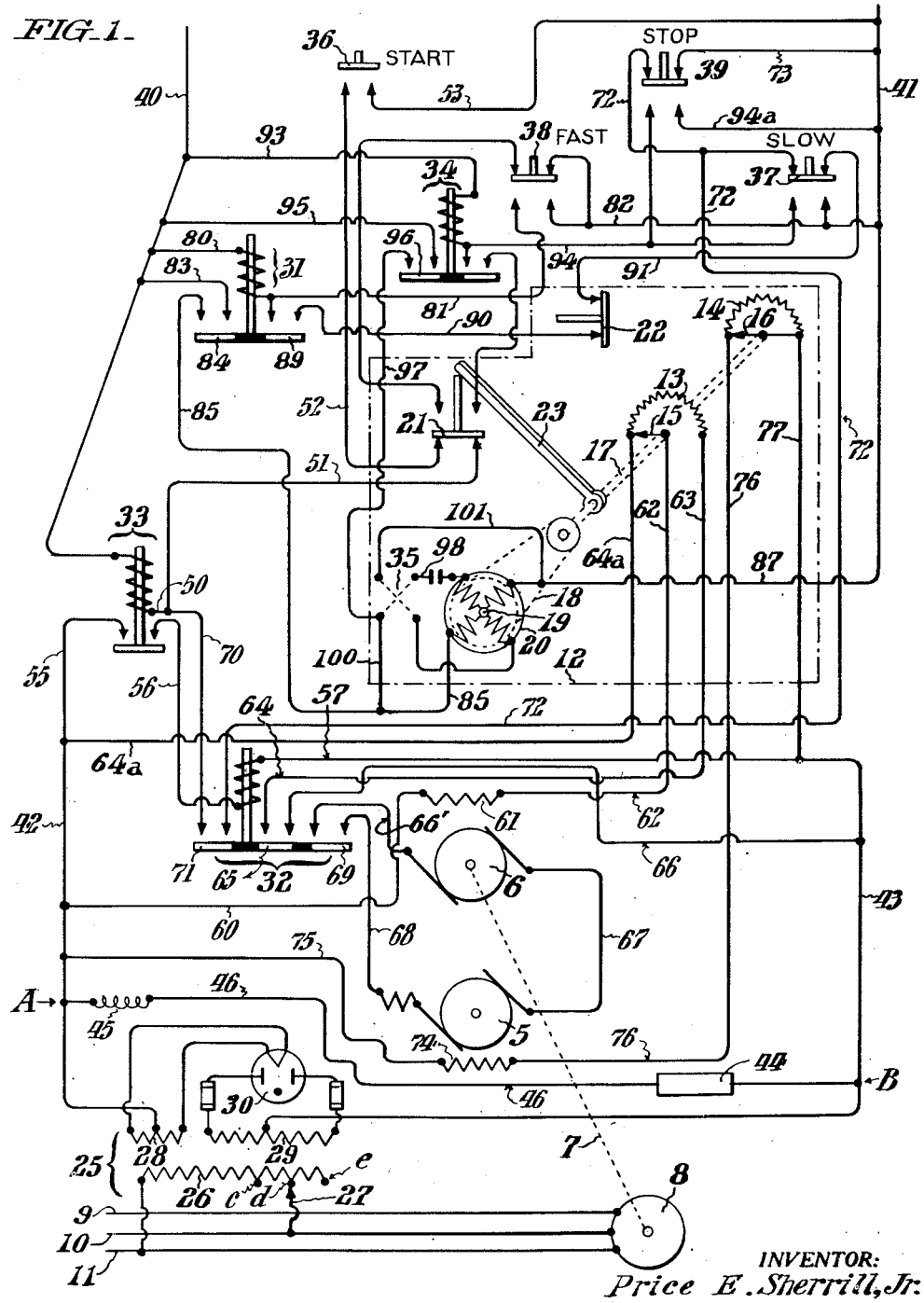

With more detailed reference first to diagrammatic Fig. 1 of these illustrations, the numeral 5 designates the D. C. motor which is to serve as the prime mover and which is to be controlled, and 6 the D. C. generator which produces the current for operating said motor. The generator 6 is driven, through a mechanical connection 7, by a three phase A. C. induction motor 8 supplied with A. C. current from mains 9, 10 and 11. The means provided for controlling the speed of motor 5 comprises a control unit or device (to be later more fully described), said device being represented by the dash and dot rectangle 12 and shown as including a pair of variable resistance control elements consisting of the potentiometer 13 and the rheostat 14. The contact arms 15 and 16 of control elements 13 and 14 are both fixed upon a shaft 17 arranged to be rotated in one direction or the other, through a belt or sprocket chain 18 from the output shaft 19 of a reversible A. C. servomotor 20 of the capacitor start and capacitor run type. Also embodied in the device 12 are limit switches 21 and 22 which are arranged to be actuated by a contact finger 23 on shaft 17. Other instrumentalities utilized in the control of motor 5 include a transformer 25 with a primary coil 26 whereof one end is directly connected to the A. C. main 11, and the other end connected, through a selector switch 27, to the main 10, and with two secondary coils 28 and 29; an electron tube 30 of the full wave rectifier type whereof the filament is connected across the terminals of the coil 28 and the plates or cathodes are connected across the coil 29 with interposition of resistors; relays 31, 32, 33, 34; a reversing switch 35 for servomotor 20; and "Start," "Slow," "Fast" and "Stop" push buttons 36, 37, 38 and 39 respectively. These several instrumentalities are variously interposed in two different circuits of a wiring system, one an auxiliary 110 volt A. C. circuit of which the mains are designated 40 and 41, and the other a D. C. circuit with mains 42 and 43 across which a pressure of 230 volts is maintained between the points A—B, by the tube 30 in cooperation with a resistance 44 and a choke coil 45 in a crosswise connecting conductor 46.

Operation

Assuming the A. C. motor 8 to be running and driving the D. C. generator 6, the system to be otherwise dormant as in Fig. 1, the D. C. motor 5 is set into motion at slow or creeping speed by pushing "Start" button 36 as in Fig. 2. As a result, the coil of relay 33 is connected across the mains 40 and 41 of the auxiliary 110 volt A. C. line, the current flowing through the coil of relay 33 from the main 40 by way of conductors 50, 51, the contact plate of closed slow limit switch 21, conductor 52, closed "Start" switch 36, and conductor 53 to the main 41. By this actuation of relay 33, the coil of relay 32 is energized by current flow from the main 42 of the D. C. circuit by way of conductor 55, switch of relay 33, and conductors 56 and 57. With the relay 32 closed, D. C. current will flow from main 42 through conductor 60, shunt field coil 61 of D. C. generator 6, conductor 62, the effective resistance of potentiometer 13, conductor 63, switch plate 65 of relay 32, and conductor 66 to the main 43, and also from line 42 to said potentiometer by way of conductor 64a. At the same time, the armature of D. C. motor 5 will be connected across the armature of the generator 6 upon closing of a secondary circuit 66', 67, 68 by the bridge plate 69 of relay 32. Upon release of "Start" button 36, the coil of relay 33 is kept energized by current flow in a lock-in circuit from main 40 through conductors 50, 70, the bridge plate 71 of relay 32, conductor 72, contact plate of "Stop" button 39, and conductor 73 to main 41. Under these conditions, the generator 6 will deliver current for operation of the D. C. motor 5 at slow speed, the field coil 74 of the latter being energized by the D. C. current flow from the main 42 by way of conductors 75, 76, rheostat 14, and conductor 77 to main 43.

If the "Fast" button 38 is now pressed as in Fig. 3, the coil of relay 31 will be energized by current flow from main 40 by way of conductors 80, 81 and 82 to main 41. By actuation of the relay 31 another circuit is closed between mains 40 and 41 through conductor 83, switch plate 84 of said relay, conductor 85, motor 20 and conductor 87. As a consequence, the motor 20 is driven in the direction of the arrow in Fig. 3 and the shaft 17 turned in the same direction, with attendant retraction of the finger 23 from the slow limit switch 21 and gradual cutting out more and more of the resistance of the potentiometer 13 and adding resistance in rheostat 14. The current flow in the field of the motor 5 is thus decreased and the current flow in the field of generator 6 is progressively increased and the rotation of said motor 5 correspondingly accelerated. It will be observed that during operation of the potentiometer 13 as just explained, part of its resistance will be in series with the field of generator 6, and part thereof in parallel with said field. Upon release of "Fast" button 38, relay 31 is held temporarily closed by current flow in a lock-in circuit from main 40 through conductors 80, bridge plate 89 of said relay, conductor 90, closed fast limit switch 22, conductor 91, "Slow" switch 37, conductors 92, 72, "Stop" switch 39, and conductor 73 to main 41. When the motor 5 has attained full speed (the rate of which is predetermined as later on explained), the fast limit switch 22 is automatically opened by the finger 23, thereby breaking the circuit 80, 89, 90, 22, 91, 37, 92, 72, 39 and 73, with consequent opening of the relay 31 and breaking, in turn, of the circuit 85, 87 to stop the servomotor 20.

If, while the motor 5 is running at full speed, the "Slow" button 37 is pressed as in Fig. 4, the coil of relay 34 will be energized by current flow from main 40 through conductors 93, 94 to main 41. Upon closing of relay 34, a circuit will be established from main 40 through plate 96 of relay 34, conductor 97, reversing switch 35, conductor 98, and conductors 100, 101 and 87 to main 41. The servomotor 20 is thereby reversed in rotation and kept running to operate the variable resistance elements 13 and 14, with attendant gradual decrease in the resistance in the field of the motor 5 and increase in the resistance in the field of the generator 6 until the finger 23 re-engages and opens the slow limit switch 21. The motor 5 will thereupon operate at the predetermined low speed under the conditions described in connection with Fig. 2.

If the "Stop" button 39 is pressed as in Fig. 5, while the motor 5 is running at full speed, the coil of relay 33 will be de-energized by breaking of circuit 40, 50, 70, 71, 72, 73, 41, and followed by de-energization of the coil of relay 32 through breaking of circuit 42, 56, 57, 43 and opening of the latter relay. Here, however, the coil of relay 34 will be energized to bring about reverse rotation of the motor 20 for return thereby of the finger 23 to depress slow limit switch 21. Upon such actuation of switch 21, the system will be restored to the dormant condition in which it is shown in Fig. 1.

Figure 2:
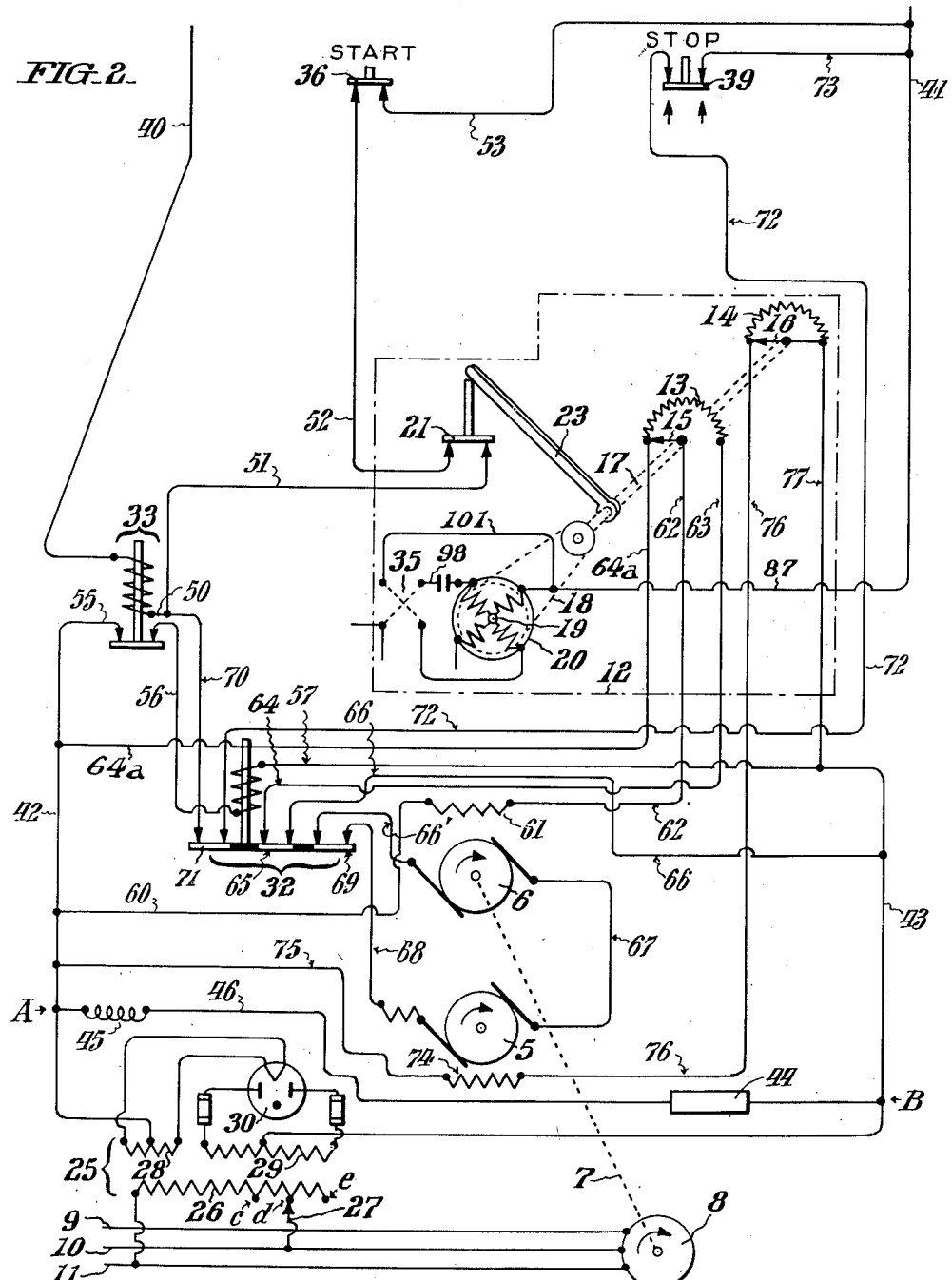

If the "Stop" button 39 is pushed with the motor 5 running slow as in Fig. 2, the coil of relay 33 will be de-energized by breaking of circuit 40, 50, 70, 71, 72, 73 and 41 as before, with consequent opening of said relay and restoration of the system likewise to the dormant condition of Fig. 1.

The purpose of the tapped primary 26 of transformer 25 is to secure the proper voltage on the electronic tube 30 in order to obtain the maximum output from the latter and thereby increase its longevity. If the voltage in the A. C. line 10, 11 is normal, the selector switch 27 is set at the point d. If it is high, said switch is set at the point e and if it is low, said switch is set at the point c as may be required.

In practice, the device diagrammatically represented at 12 in Fig. 1 is given the form illustrated in Figs. 6 and 7. As shown, it comprises a base 105 whereon is mounted the A. C. motor 20 together with a casing 106 in which the elements 13 and 14 are housed. Secured to the output shaft 19 of motor 20 is a leather faced clutch disk 107, and held in frictional engagement with said disk by a regulatable spring 108 is a sprocket wheel 109 which, through the chain 18, is geared to a sprocket pinion 110 on the shaft 17 whereto the contact arms 15 and 16 (not here shown) of the elements 13 and 14 are affixed. The finger 23, hereinbefore referred to, is made fast to the hub of the sprocket wheel 109 by a set screw 111. The "Slow" limit switch 21 is secured to the back of a panel 112 upstanding from the front edge of the base 105, the same being so positioned that its actuating plunger 113 is in the path of the finger 23 as shown in Fig. 7. The "Fast" limit switch 22, on the other hand, is carried by a block 114 having a laterally projecting stud 115 which extends outward through an arcuate slot 116 in the panel 112 in concentric relation to the axis of the motor shaft 19. Free on the protruding end of the stud 115 is a hollow clamp collar 117 containing a loading spring 118; and threadedly engaged with the stud is a hand wheel 119 which, when tightened, forces said collar against the panel 112 in opposition to spring resistance, to set the switch 22 in adjusted positions along the slot 116 in said panel, with its actuating plunger 120 positioned, like that of switch 21, in the path of the finger 23. The ratio of the sprocket wheels 109, 110 is two to one, so that a half rotation of the motor shaft 19 will result in a complete rotation of the shaft 17. A stop block indicated at 121, serves, by co-operation with a stud 122 on sprocket 110, to prevent overtravel of the shaft 17 under drive of the motor 20, this action being allowed by slippage of the clutch disk 107 relative to the sprocket 109.

My invention is not necessarily limited to the precise details of construction and arrangement herein disclosed by way of example since, within the scope of the appended claims, these are subject to considerable variation as will be readily understood by those skilled in the art of electric motor control.

Having thus described my invention, I claim:

1. A pre-assembled unit for use in an electric control system for power drives, said unit comprising a base; a reversible servomotor mounted on the base together with a rheostat having two co-axially arranged rotary variable resistance elements and individual contact arms affixed to a common actuating shaft; gearing connecting the shaft of the motor with the contact arm actuating shaft of the rheostat; an upright panel rising from the base forwardly of the motor and rheostat; a pair of limit switches in spaced relation at the back of the panel; and a finger carried by the shaft of the motor and adapted to actuate one of the switches when the motor is rotated in one direction, and to actuate the other switch when the motor is rotated in the opposite direction.

2. A pre-assembled electric control unit according to claim 1, wherein the limit switches are secured to the panel with capacity for relative adjustment along an arc having its center of curvature in the axis of the motor shaft.

3. A pre-assembled electric control unit according to claim 1, wherein the panel is provided with an arcuate slot having its center of curvature in the axis of the motor shaft; and wherein at least one of the switches has a lateral stud projecting through the slot and a clamp wheel threadedly engaged on the protruding end of the stud, whereby the switch can be adjusted along said slot.

4. A pre-assembled electric control unit according to claim 1, wherein the finger is frictionally connected to the motor shaft for capacity to slip upon contacting either of the limit switches.

5. A pre-assembled electric control unit according to claim 1, wherein the gearing includes a sprocket wheel connected, through slip clutch means to the motor shaft and carrying the finger, a sprocket wheel affixed to the actuating shaft of the rheostat, and a chain connecting the two sprocket wheels.

PRICE E. SHERRILL, Jr.

REFERENCES CITED

The following references are of record in the file of this patent:

UNITED STATES PATENTS

| Number | Name | Date |
|---|---|---|
| 865,813 | Powell | Sept. 10, 1907 |
| 1,618,827 | Jewitt | Feb. 22, 1927 |
| 2,036,629 | Grosvenor | Apr. 7, 1936 |
| 2,070,590 | Goldsmith | Feb. 16, 1937 |
| 2,281,844 | Jones | May 5, 1942 |
| 2,303,499 | Rich | Dec. 1, 1942 |
| 2,433,130 | Larsen | Dec. 23, 1947 |
| 2,500,753 | Higgs | Mar. 14, 1950 |
| 2,512,745 | Kebler | June 27, 1950 |